(12) United States Patent
Hedinsson et al.

(10) Patent No.: US 11,381,863 B2
(45) Date of Patent: Jul. 5, 2022

(54) SYSTEMS AND METHODS FOR CREATING CUSTOM MEDIA CHANNELS

(71) Applicant: Disney Enterprises, Inc., Burbank, CA (US)

(72) Inventors: Skarphedinn Hedinsson, Encino, CA (US); Michael P. Goslin, Sherman Oaks, CA (US); Scott F. Watson, Marina Del Rey, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/073,506

(22) Filed: Mar. 17, 2016

(65) Prior Publication Data

US 2017/0272799 A1 Sep. 21, 2017

(51) Int. Cl.
*H04N 21/2668* (2011.01)
*H04N 21/482* (2011.01)
(Continued)

(52) U.S. Cl.
CPC ..... *H04N 21/2668* (2013.01); *H04N 21/4334* (2013.01); *H04N 21/44213* (2013.01); *H04N 21/4532* (2013.01); *H04N 21/4667* (2013.01); *H04N 21/47202* (2013.01); *H04N 21/4821* (2013.01)

(58) Field of Classification Search
CPC ......... H04N 21/4755; H04N 21/47202; H04N 21/432; H04N 21/4325; H04N 21/4532; H04N 5/44543; H04N 21/44222; H04N 7/163; H04N 21/482; H04N 21/4622; H04N 21/84; H04N 21/2668; H04N 21/4334;
(Continued)

(56) References Cited

U.S. PATENT DOCUMENTS

| 6,774,926 B1 * | 8/2004 | Ellis | H04N 5/44543 |
| | | | 348/14.01 |
| 2005/0166230 A1 * | 7/2005 | Gaydou | G11B 27/105 |
| | | | 725/41 |

(Continued)

OTHER PUBLICATIONS

Entire File History for U.S. Appl. No. 14/454,677, filed Aug. 7, 2014, and titled "Systems and Methods for Customizing Channel Programming."

*Primary Examiner* — Ngoc K Vu
(74) *Attorney, Agent, or Firm* — Farjami & Farjami LLP

(57) ABSTRACT

There is provided a system including a memory and a processor configured to display a programming guide for a first media channel including a first media content scheduled to play at a first broadcast time and a second media channel including a second media content scheduled to play at a second broadcast time, receive a user input for creating a custom channel, the custom channel including the first media content obtained from the first media channel and the second media content obtained from the second media channel, create a custom content for the custom channel, in response to the user input, by obtaining the first media content from the first media channel at the first broadcast time and obtaining the second media content from the second media channel at the second broadcast time, receive a request for playing the custom channel, and display the custom content of the custom channel on a display.

20 Claims, 4 Drawing Sheets

(51) Int. Cl.
*H04N 21/472* (2011.01)
*H04N 21/45* (2011.01)
*H04N 21/466* (2011.01)
*H04N 21/442* (2011.01)
*H04N 21/433* (2011.01)

(58) Field of Classification Search
CPC ......... H04N 21/44213; H04N 21/4667; H04N 21/4821
See application file for complete search history.

(56) References Cited

U.S. PATENT DOCUMENTS

| | | | |
|---|---|---|---|
| 2007/0199019 A1* | 8/2007 | Angiolillo | H04N 7/17318 |
| | | | 725/39 |
| 2008/0010656 A1* | 1/2008 | Cho | H04N 21/4312 |
| | | | 725/40 |
| 2008/0052026 A1 | 2/2008 | Amidon | |
| 2008/0242221 A1 | 10/2008 | Shapiro | |
| 2010/0333138 A1* | 12/2010 | Klappert | H04N 5/44543 |
| | | | 725/39 |
| 2012/0054278 A1 | 3/2012 | Taleb | |
| 2012/0110621 A1* | 5/2012 | Gossweiler, III | G06Q 50/01 |
| | | | 725/46 |
| 2013/0086612 A1* | 4/2013 | Kim | H04N 21/482 |
| | | | 725/40 |
| 2013/0139202 A1 | 5/2013 | Purpura | |
| 2013/0185750 A1 | 7/2013 | Ayoub | |
| 2013/0291018 A1 | 10/2013 | Billings | |
| 2014/0229964 A1* | 8/2014 | Waisanen | H04N 21/466 |
| | | | 725/14 |
| 2014/0229968 A1 | 8/2014 | Francisco | |
| 2015/0012416 A1 | 1/2015 | Woods | |
| 2015/0019342 A1 | 1/2015 | Gupta | |
| 2015/0163636 A1 | 6/2015 | Macleod | |
| 2015/0358661 A1* | 12/2015 | Navarro | H04N 21/2668 |
| | | | 725/59 |
| 2016/0044356 A1 | 2/2016 | Arana | |
| 2016/0142783 A1* | 5/2016 | Bagga | H04N 21/47214 |
| | | | 725/47 |
| 2016/0337704 A1* | 11/2016 | Binder | H04N 21/4826 |

* cited by examiner ary system for creating custom media channels, substantially as shown in and/or described in connection with at least one of the figures, as set forth more completely in the claims.

SYSTEMS AND METHODS FOR CREATING CUSTOM MEDIA CHANNELS

BACKGROUND

Traditionally, watching television meant selecting a television station to watch and watching the programming and advertisements broadcast thereon. Digital video recorders began to free viewers from the traditional model by allowing the viewers to choose when to watch a program, and even allowing the consumer to forward through advertisements. Cable providers began to provide some on-demand content, allowing the viewers to pay extra to view the on-demand content that was not otherwise available. Now, television networks and other content providers commonly provide programs for viewing on-line. However, such on-line and on-demand viewings, and other alternative viewing options do not completely fulfill the viewer's desire for personal and customized viewing options.

SUMMARY

The present disclosure is directed to systems and methods for creating custom media channels, substantially as shown in and/or described in connection with at least one of the figures, as set forth more completely in the claims.

DETAILED DESCRIPTION

Figure 1:
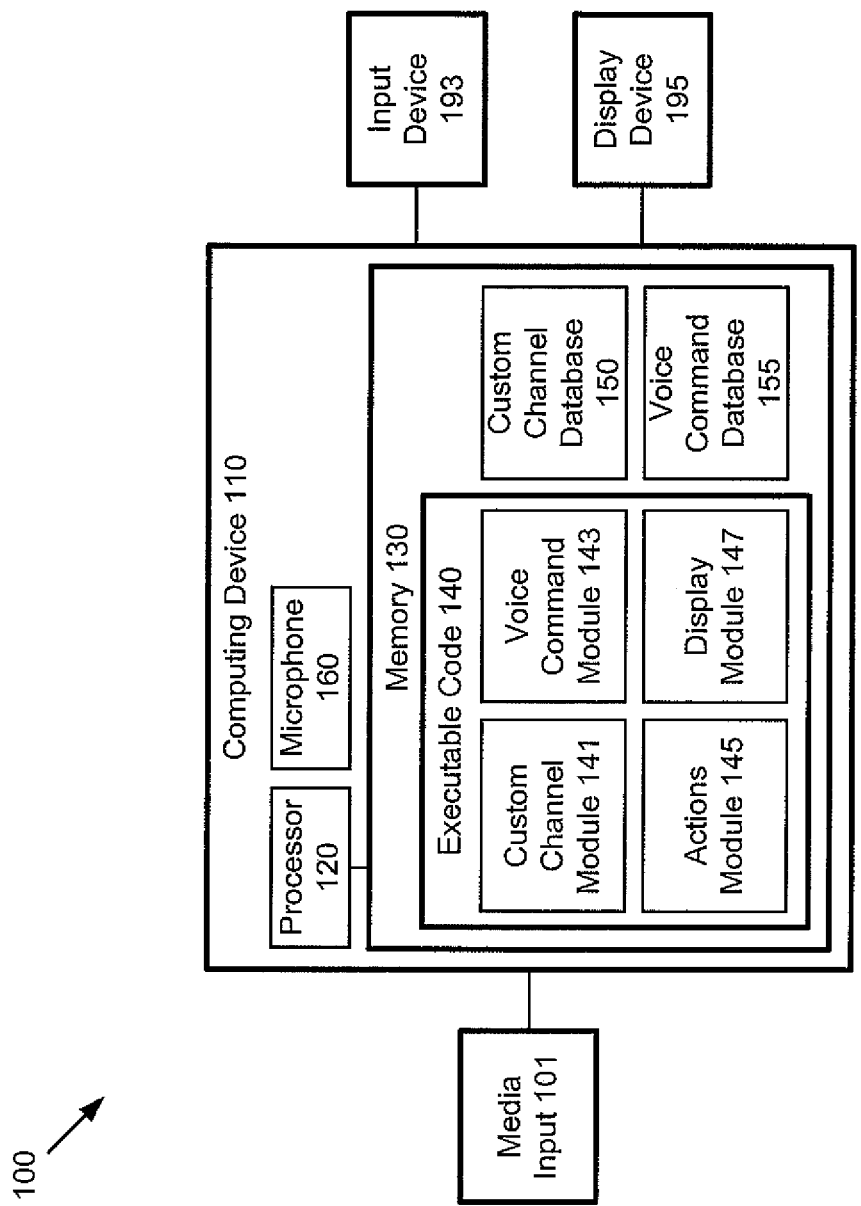
FIG. 1 shows a diagram of an exemplary system for creating a custom media channel, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for creating a custom media channel, according to one implementation of the present disclosure. Diagram 100 includes media input 101, computing device 110, input device 193, and display device 195. Computing device 110 includes processor 120, memory 130, and microphone 160. Processor 120 is a hardware processor, such as a central processing unit (CPU) used in computing devices. Memory 130 is a non-transitory storage device for storing computer code for execution by processor 120, and also storing various data and parameters. Memory 130 includes executable code 140, custom channel database 150, and voice command database 155. Computing device may be a service provider's server, or computing device 110 may be an in-home device, such as a computer, a tablet computer, a smart television, a set-top box, etc. In some implementations, computing device 110 may include input device 193 and/or display device 195.

Media input 101 may include a plurality of media channels, including a first media channel and a second media channel. In some implementations, media input 101 may be an input from a service provider, such as an internet service provider, a cable television provider, etc. Each media channel of media input 101 may include one or more media contents, such as one or more television shows, news programs, sporting events, talk shows, etc. Additionally, each media content may have an associated broadcast time including dates and times when the media content will be available for viewing. In some implementations, media input 101 may include data about each media channel and/or each media content, such as station identification identifying a broadcast station transmitting the media content, network identification identifying a media network associated with creating and/or distributing the media content, a broadcast schedule for the media content including dates and times when the media content will be available for viewing, a type or genre for each media content, etc. The type or genre of the media content may include descriptions such as news, sports, sitcom, comedy, drama, family, etc. Media input 101 may include a broadcast schedule for each media channel in media input 101.

For example, media contents of media input 101 may include a metadata container that provides information about each media content, such as, but not limited to, the title of each media content, the length of each media content, etc. ID3 tags provide the Title, Artist, Year, Genre and other information about the media file they represent, whether an audio file or a video file. An ID3 tag is a data container within a media file stored in a prescribed format. This data commonly contains, among other things, the Artist names, Title, Year and Genre of the media file. In such an example, information about media input 101 may be inserted into media content 101 using a number of different method such as, but not limited to, in the header of each media content, at the end of each media content, or as a sidecar file to each media content. For another example, information about media input 101 may be inserted into each media content of media input 101. In such an example, information about media input 101 may be inserted into the vertical ancillary data (VANC) space of each media content. Ancillary data (commonly abbreviated as ANC data), in the context of television systems, refers to a means which by non-video information (such as audio, other forms of essence, and metadata) may be embedded within the serial digital interface.

Executable code 140 includes one or more software modules stored in memory 130 for execution by processor 120 of commuting device 110. As shown in FIG. 1, executable code 140 includes custom channel module 141, voice command module 143, and actions module 145. Custom channel module 141 is a software module for execution by processor 120 to create one or more custom media channels including media contents from media input 101. Custom channel module 141 may obtain media contents, such as television shows, sporting events, etc., form media input 101. In some implementations, custom channel module 141 may play a media content from media input 101 as the media content is broadcast, i.e., live, or custom channel module 141 may record the media content for delayed transmission on one or more custom media channels. In some implementations, custom channel module 141 may save the one or more custom channels in custom channel database 151. In some implementations, the user may indicate a level of interest for each media content, such as a low level of interest, an intermediate level of interest, a high level of interest, or the level of interest may be on a scale, such as a level of interest ranging from one (1) to ten (10). In some implementations, the level of interest may be used to prioritize display of media contents.

Voice command module 143 is a software module for execution by processor 120 to detect one or more keywords spoken by a user of system 100. To detect one or more keywords spoken by the user, voice command module 143 may use microphone 160. In some implementations, voice command module 143 may detect one or more keywords in the natural speech of the user. In some implementations, voice command module 143 may receive an analog input from microphone 160 and convert the analog input signal to a digitized signal using an analog-to-digital (A/D) converter. Voice command module 143 may sample the digitized signal and search for a match in voice command database 155, and may identify the detected one or more keywords when a match is found. After identifying the one or more keywords using voice command database 155, voice command module 143 may communicate with custom channel module 141, actions module 145, and/or display module 147 to execute the command associated with the detected one or more keywords.

Actions module 145 is a software module for execution by processor 120. Actions module 145 may include one or more actions that may be executed in response to a user input, such as a voice command. For example, actions module 145 may include an action to advance to a next media content in the custom content of a custom channel in response to a user saying the command "Next." In some implementations, actions module 145 may also include actions to add a media content to a custom channel, remove a media content from a custom channel, create a new custom channel, assign a level of interest to a media content and/or custom channel, etc.

Custom channel database 150 is a database stored in memory 130. Custom channel database 150 may store one or more custom channels created by a user. Each custom channel stored in custom channel database 150 may include one or more parameters describing the media contents to be shown, such as the titles and/or other scheduling information of each media content included in the custom channel. When a user selects a custom channel to view, custom channel module 141 may retrieve the custom channel parameters from custom channel database 150.

Voice command database 155 is a database stored in memory 130 including an audio signal of one or more keywords. Each keyword of the one or more keywords may have an associated command, such as pausing playback of the custom channel, changing channels, skipping to a next or other media content, modifying a custom channel, such as by adding or removing a media content from the custom contents of the custom channel, etc. In some implementations, keywords in voice command database 155 may be associated with actions performed by actions module 145.

Microphone 160 is a microphone for receiving audio input, such as voice commands. As shown in FIG. 1, microphone 160 is included in computing device 110, although microphone 160 may be included in display device 195. Input device 191 may be a remote control, a computer mouse, a computer keyboard, etc. Display device 195 is a device for displaying custom channels. Display device 195 may be a television, a smart television, a computer, a tablet computer, etc. In some implementations, display device 195 may include computing device 110, or display device 195 may be a separate device communicably connected to computing device 110.

Figure 2:
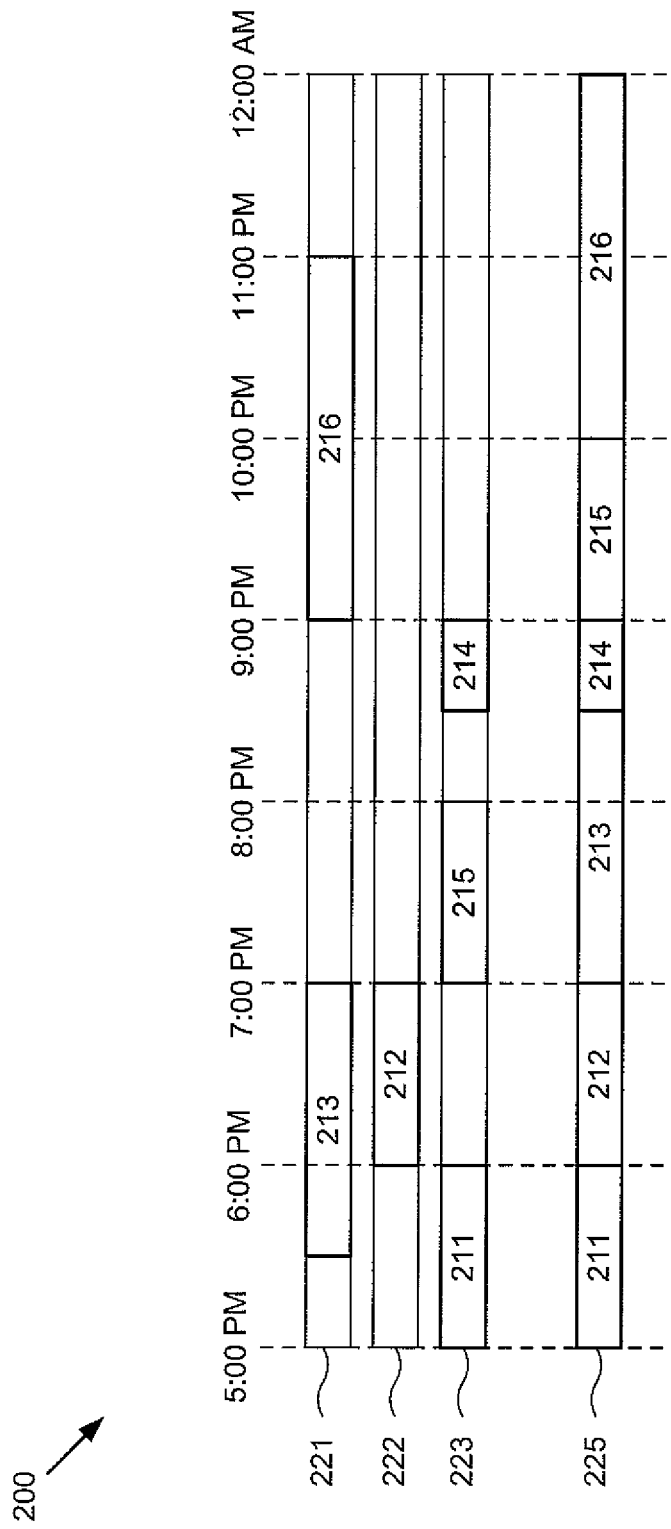
FIG. 2 shows a diagram of an exemplary programming guide for use with the system of FIG. 1, according to one implementation of the present disclosure.

FIG. 2 shows a diagram of an exemplary programming guide for use with the system of FIG. 1, according to one implementation of the present disclosure. Diagram 200 includes media channel 221, media channel 222, media channel 223, and custom channel 225, including a plurality of media contents on the media channels. Each media content is shown filling a block of time at which the media content is scheduled to broadcast in the schedule of the media channel on which the media content is shown. Media contents 211-216 are also included at the time which each media content will be transmitted as custom media contents of custom channel 225. As shown in FIG. 2, media content 211 is scheduled to be broadcast on media channel 223 beginning at 5:00 PM and running until 6:00 PM. Media content 211 is included as a custom content in custom channel 225 as live content. After media content 211, custom channel 225 includes media content 212. Media content 212 is a program scheduled to show on media channel 222 beginning at 6:00 PM and running until 7:00 PM. A viewer watching custom channel 225 may watch media content 211 followed by media content 212 without changing the channel.

Following media content 212, custom channel 225 includes media content 213. Media content 213 is a program scheduled to show on media channel 221 beginning at 5:30 PM and running until 7:00 PM. Media content 213 is included as a custom content in custom channel 225 as content has been recorded for delayed transmission. Custom media channel 225 allows the user to view media content 212 followed by media content 213 without changing the channel, even though media content 213 began broadcasting before media content 212 and was broadcast on a different media channel than media content 213. Following media content 213, custom channel 225 includes media content 214 which is included as live content concurrently showing on media channel 223 beginning at 8:30 PM and running until 9:00 PM. Media content 215 follows media content 214 on channel 225. Media content 215 is scheduled to broadcast on media channel 223 beginning at 7:00 PM and running until 8:00 PM, and is included as custom content of custom channel 225 beginning at 9:00 PM and running until 10:00 PM. Beginning at 10:00 PM and running until 12:00 AM, custom channel 225 includes media content 216. Media content 216 is scheduled to broadcast on media channel 221 beginning at 9:00 PM and running until 11:00 PM, and is included as custom content recorded for delayed transmission on custom channel 225.

Figure 3:
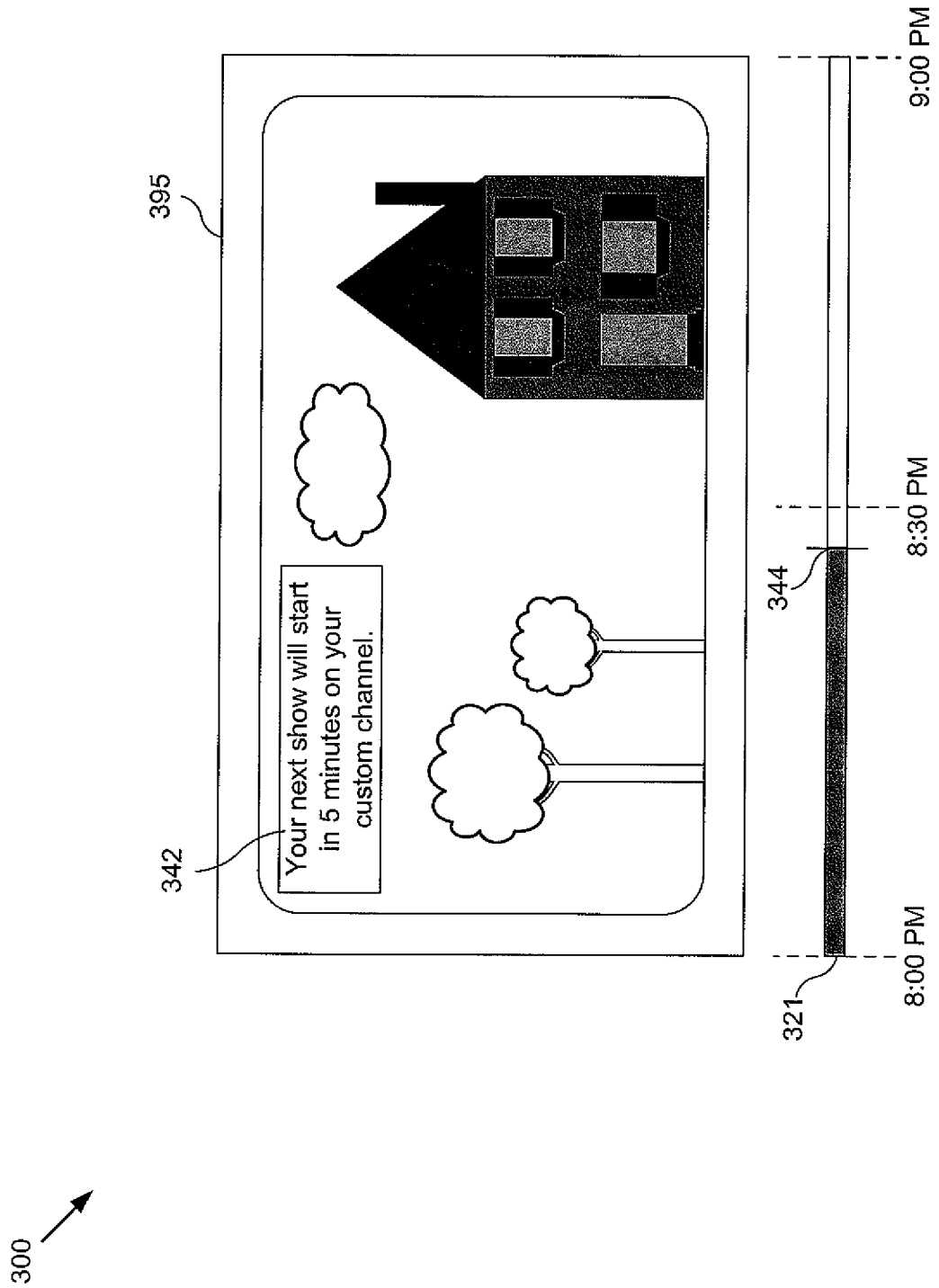
FIG. 3 shows a diagram of an exemplary display showing a media content and a custom media channel message, according to one implementation of the present disclosure.

FIG. 3 shows a diagram of an exemplary display showing a media content and a custom media channel message, according to one implementation of the present disclosure. Diagram 300 shows display device 395 showing a media content broadcast on media channel 321 beginning at 8:00 PM and scheduled to run until 9:00 PM. As shown in FIG. 3, at about 8:25 PM, message 342 is displayed on the display of display device 395 during playback of the media content indicating to the viewer that the viewer's custom channel has a scheduled custom content that will begin in five minutes, at 8:30 PM. In some implementations, executable code 140 may switch to the custom media channel at the beginning of each custom content included therein, or executable code 140 may communicate the pending custom media content, such as by displaying message 342. If a viewer chooses not to watch the custom media channel, executable code 140 may record the custom media channel for on-demand viewing at a later time.

In some implementations, a user may have a plurality of custom media channels. If the user is currently viewing a custom content of a custom channel, another of the user's custom channels may have a custom content that the user has marked with an equal or higher level of interest. Executable code 140 may display a message, such as message 342. In some implementations, executable code 140 may switch to the custom media channel playing the media content having the higher level of interest. In other implementations, executable code 140 may continue displaying the custom channel currently viewed by the user, and notify the user of the alternate media content using a display a message such as message 342.

Figure 4:
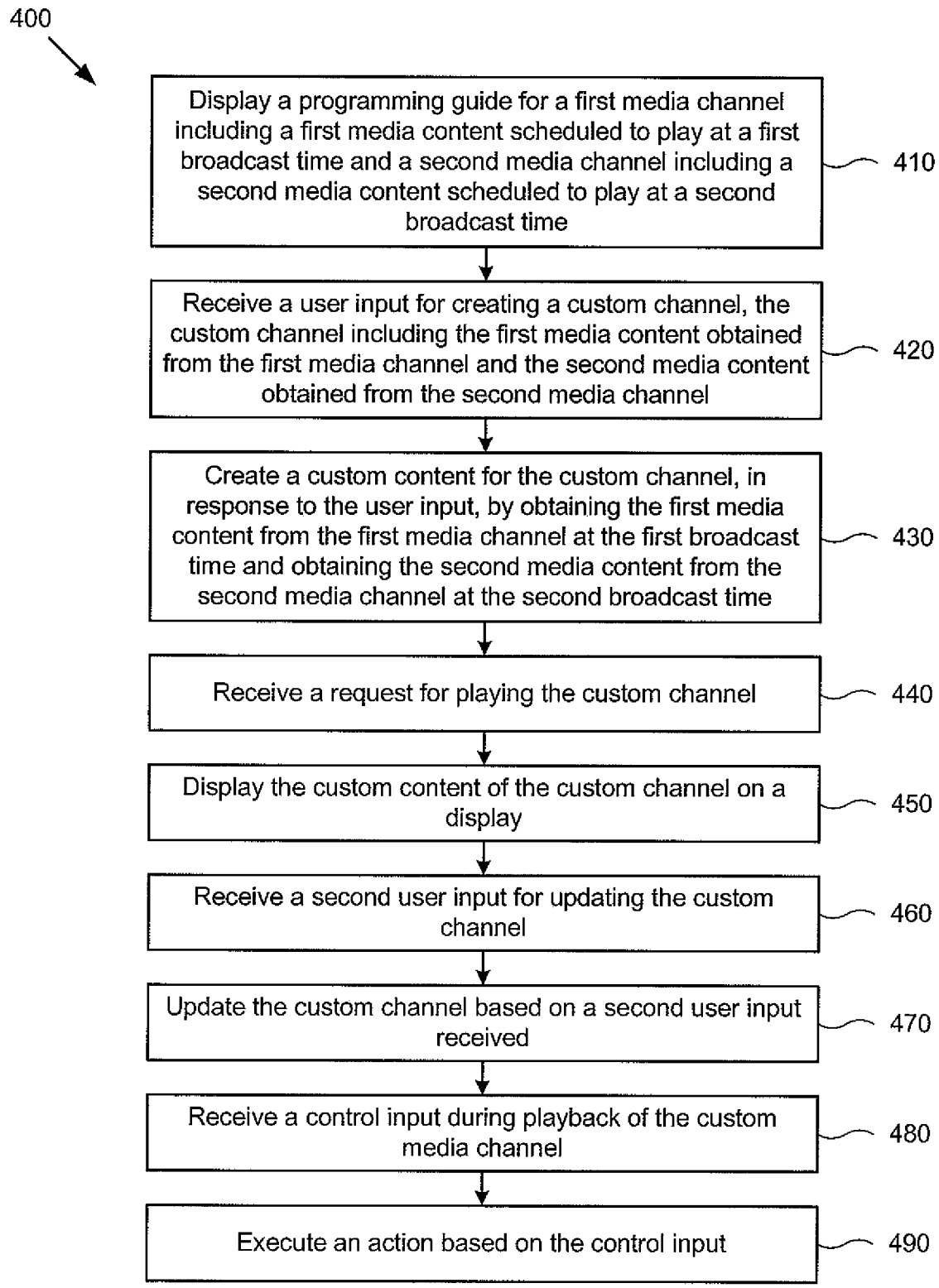
FIG. 4 shows a flowchart illustrating an exemplary method of eating a custom media channel, according to one implementation of the present disclosure.

FIG. 4 shows a flowchart illustrating an exemplary method of creating a custom media channel, according to one implementation of the present disclosure. Method 400 begins at 410, where executable code 140 displays a programming guide for a first media channel including a first media content scheduled to play at a first broadcast time and a second media channel including a second media content scheduled to play at a second broadcast time. The programming guide may include a plurality of media channels and the scheduled media contents for each media channel provided by a service provider, such as a cable television provider.

At 420, executable code 140 receives a user input for creating a custom channel, the custom channel including the first media content obtained from the first media channel and the second media content obtained from the second media channel. In some implementations, executable code may require a user to sign in to a user account before creating a custom media channel. Custom channel module 141 may receive a user input from input device 193 selecting a first media content from a first media channel and a second user input from input device 193 selecting a second media content from a second media channel, the first media content and the second media contents selected to be included as custom media contents in the custom media channel.

At 430, executable code 140 creates a custom content for the custom channel, in response to the user input, by obtaining the first media content from the first media channel at the first broadcast time and obtaining the second media content from the second media channel at the second broadcast time. In some implementations, custom channel module 141 may save the first media content and the second media content in memory 130, or custom channel module 141 may save a location of the first media content and the second media content, such as a URL locating the media contents on one or more media servers. Method 400 continues at 440, where executable code 140 receives a request for playing the custom channel. Executable code 140 may receive a request from input device 193 or display device 195 requesting to play the custom media channel. At 450, executable code 140, using display module 147, displays the custom content of the custom channel on a display. The display may be a television, a computer display, a tablet computer, a mobile phone, etc.

At 460, executable code 140 receives a second user input for updating the custom channel. The second user input may come from input device 193 or display device 195 and may update the custom channel by adding a media content to the custom contents of the custom media channel, removing a media content to the custom contents of the custom media channel, changing the order of one or more custom contents of the custom media channel, etc. In some implementations, the second user input may come from a voice input using microphone 160. Voice command module 143 may detect one or more keywords spoken by a user, match the detected one or more keywords with a command in voice command database 155, and execute the command. Method 400 continues at 470, where executable code 140 updates the custom channel based on a second user input received.

At 480, executable code 140 receives a control input. The control input may be an input from input device 193, display device 195, or a voice input received via microphone 160. For example, a user viewing a media content may want to view more media contents including similar subject matter. The user may use input device 193 to select a "more like this" option, directing actions module 145 to find more media contents similar to the media content being viewed. In other implementations, the user may speak a command, such as speaking "more like this," and actions module 145 may find more media contents similar to the one being viewed. Method 400 continues at 490, where executable code 140 executes the action based on the control input.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a non-transitory memory storing an executable code;
a hardware processor is configured to execute the executable code to:
display a programming guide for a plurality of media channels including a plurality of media contents scheduled to play at a plurality of broadcast times;
receive an input of a user for creating custom contents for a plurality of custom channels using the plurality of media contents;
create a first custom content of the custom contents for a first one of the plurality of custom channels, in response to the input, by obtaining a first media content from any of the plurality of the media channels at a first broadcast time of the plurality of broadcast times and obtaining a second media content from any of the plurality of the media channels at a second broadcast time of the plurality of broadcast times;
create a second custom content of the custom contents for a second one of the plurality of custom channels, in response to the input, by obtaining a third media content from any of the plurality of the media channels at a third broadcast time of the plurality of broadcast times, wherein the input indicates a level of interest in each of the first media content, the second media content, and the third media content, and wherein the level of interest in the first media content is higher than the level of interest in the third media content;

play the third media content on the second one of the plurality of custom channels; and in response to and based on the level of interest in the first media content being higher than the level of interest in the third media content, while the third media content is being played on the second one of the plurality of custom channels, display a custom channel message prior to playing the first media content on the first one of the plurality of custom channels, wherein the custom channel message indicates when the first media content is scheduled to play on the first one of the plurality of custom channels.

2. The system of claim 1, wherein the hardware processor is further configured to execute the executable code to:

when the user does not choose to continue watching the third media content, switch from the third media content being played on the second one of the plurality of custom channels to the first media content being played on the first one of the plurality of custom channels, in response to and based on the level of interest in the first media content being higher than the level of interest in the third media content; and when the user chooses to not continue watching the third media content, record the first media content for on-demand viewing by the user at a later time.

3. The system of claim 1, wherein the first broadcast time is before the second broadcast time, and wherein the first media content in the first one of the plurality of custom channels is scheduled to play after the second media content in the first one of the plurality of custom channels.

4. The system of claim 1, wherein the first media content and the second media content include at least one of a television show, a news program, or a sporting event.

5. The system of claim 1, wherein obtaining the second media content at least partially overlaps with obtaining the first media content.

6. The system of claim 1, wherein the hardware processor is further configured to execute the executable code to:

in response to the user selecting a more-like-this option while the third media content is being played, find one or more media contents having a subject matter similar to that of the third media content for playing to the user.

7. The system of claim 1, wherein the hardware processor is further configured to execute the executable code to:

record, in the non-transitory memory, the third media content playing on the second one of the plurality of custom channels for subsequent on-demand viewing when the user is currently watching a third media channel of the plurality of media channels.

8. The system of claim 1, wherein the hardware processor is further configured to execute the executable code to:

receive a second input of the user for updating the second one of the plurality of custom channels; and update the second one of the plurality of custom channels based on the second input.

9. The system of claim 1, wherein, during playback of the third media content, the hardware processor is further configured to execute the executable code to:

receive a second input of the user; and execute an action based on the second input.

10. The system of claim 1, wherein the input indicates a level of interest in each of the plurality of custom channels.

11. A method for use with a system including a hardware processor and a non-transitory memory storing an executable code, the method comprising:

displaying, using the hardware processor executing the software code, a programming guide for a plurality of media channels including a plurality of media contents scheduled to play at a plurality of broadcast times;

receiving, using the hardware processor executing the software code, an input of a user for creating custom contents for a plurality of custom channels using the plurality of media contents;

creating, using the hardware processor executing the software code, a first custom content of the custom contents for a first one of the plurality of custom channels, in response to the input, by obtaining a first media content from any of the plurality of the media channels at a first broadcast time of the plurality of broadcast times and obtaining a second media content from any of the plurality of the media channels at a second broadcast time of the plurality of broadcast times;

creating, using the hardware processor executing the software code, a second custom content of the custom contents for a second one of the plurality of custom channels, in response to the input, by obtaining a third media content from any of the plurality of the media channels at a third broadcast time of the plurality of broadcast times, wherein the input indicates a level of interest in each of the first media content, the second media content, and the third media content, and wherein the level of interest in the first media content is higher than the level of interest in the third media content;

playing the third media content on the second, using the hardware processor executing the software code, one of the plurality of custom channels; and in response to and based on the level of interest in the first media content being higher than the level of interest in the third media content, while the third media content is being played on the second one of the plurality of custom channels, displaying, using the hardware processor executing the software code, a custom channel message prior to playing the first media content on the first one of the plurality of custom channels, wherein the custom channel message indicates when the first media content is scheduled to play on the first one of the plurality of custom channels.

12. The method of claim 11, further comprising:

when the user does not choose to continue watching the third media content, switching, using the hardware processor executing the software code, from the third media content being played on the second one of the plurality of custom channels to the first media content being played on the first one of the plurality of custom channels, in response to and based on the level of interest in the first media content being higher than the level of interest in the third media content; and when the user chooses to not continue watching the third media content, record the first media content for on-demand viewing by the user at a later time.

13. The method of claim 11, wherein the first broadcast time is before the second broadcast time, and wherein the first media content in the first one of the plurality of custom channels is scheduled to play after the second media content in the first one of the plurality of custom channels.

14. The method of claim 11, wherein the first media content and the second media content include at least one of a television show, a news program, or a sporting event.

15. The method of claim 11, wherein obtaining the second media content at least partially overlaps with obtaining the first media content.

16. The method of claim 11, further comprising:
- in response to the user selecting a more-like-this option while the third media content is being played, finding one or more media contents having a subject matter similar to that of the third media content for playing to the user.

17. The method of claim 11, further comprising:
- recording, in the non-transitory memory using the hardware processor executing the software code, the third media content playing on the second one of the plurality of custom channels for subsequent on-demand viewing when the user is currently watching a third media channel of the plurality of media channels.

18. The method of claim 11, further comprising:
- receiving, using the hardware processor executing the software code, a second user input of the user for updating the second one of the plurality of custom channels; and
- updating, using the hardware processor executing the software code, the second one of the plurality of custom channels based on the second input.

19. The method of claim 11, further comprising:
- during playback of the third media content, receiving, using the hardware processor executing the software code, a second input of the user; and
- executing, using the hardware processor executing the software code, an action based on the second input.

20. The method of claim 11, wherein the input indicates a level of interest in each of the plurality of custom channels.

\* \* \* \* \*